May 4, 1926.
C. C. FARMER ET AL
1,582,917
FLUID PRESSURE BRAKE
Filed June 30, 1924
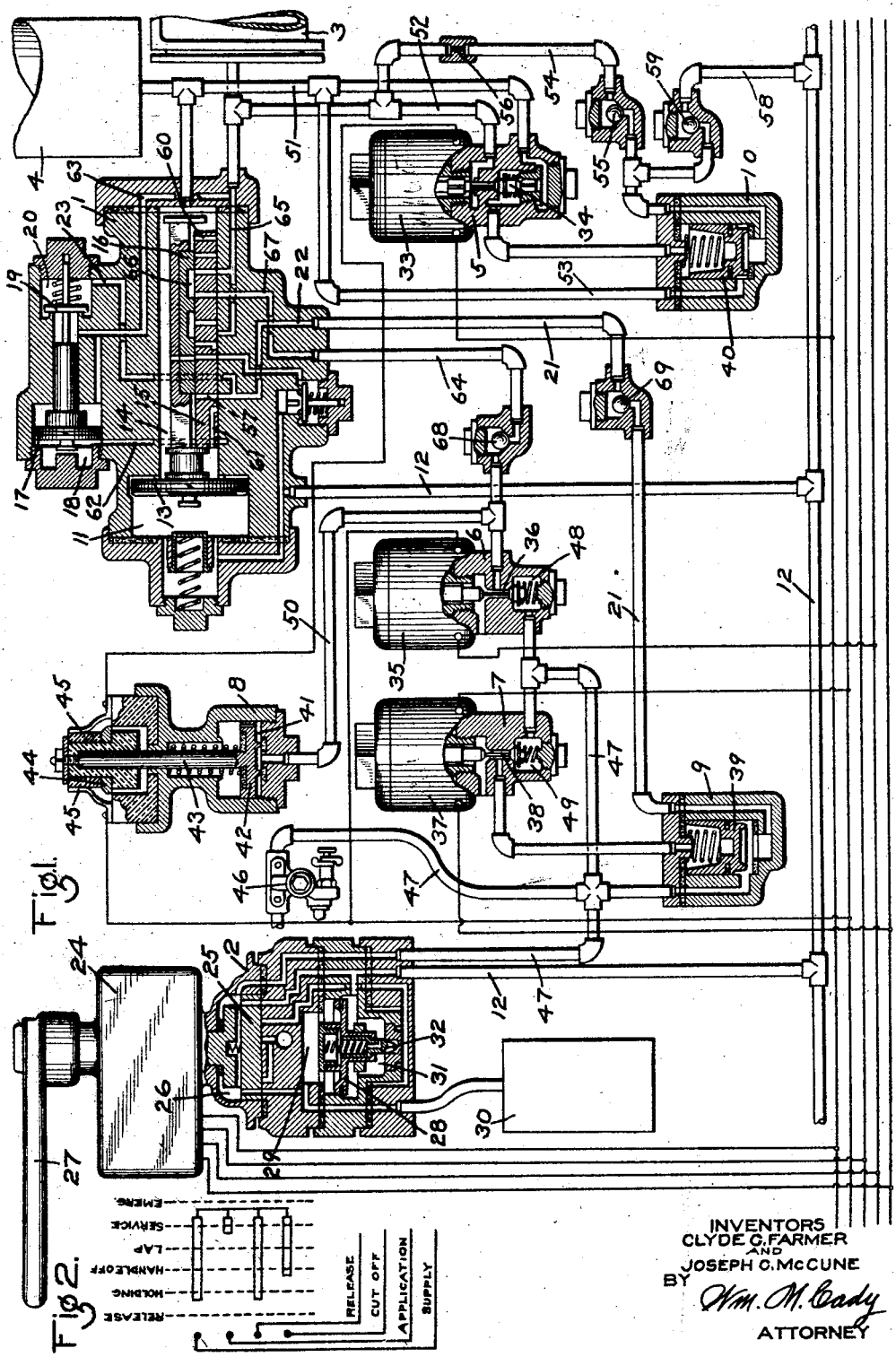
INVENTORS
CLYDE C. FARMER
AND
JOSEPH C. McCUNE
BY
Wm. M. Cady
ATTORNEY Patented May 4, 1926.

1,582,917

UNITED STATES PATENT OFFICE.

CLYDE C. FARMER, OF PITTSBURGH, PENNSYLVANIA, AND JOSEPH C. McCUNE, OF ORANGE, NEW JERSEY, ASSIGNORS TO THE WESTINGHOUSE AIR BRAKE COMPANY, OF WILMERDING, PENNSYLVANIA, A CORPORATION OF PENNSYLVANIA.

FLUID-PRESSURE BRAKE.

Application filed June 30, 1924. Serial No. 723,113.

*To all whom it may concern:*

Be it known that we, CLYDE C. FARMER and JOSEPH C. McCUNE, both citizens of the United States, and residents, respectively, of Pittsburgh, in the county of Allegheny and State of Pennsylvania, and Orange, in the county of Essex and State of New Jersey, have jointly invented certain new and useful Improvements in Fluid-Pressure Brakes, of which the following is a specification.

This invention relates to electro-pneumatic brakes adapted to be controlled either electrically or by fluid under pressure.

One object of our invention is to provide an electro-pneumatic brake having improved means for ensuring an application of the brakes in case of failure of the electrically controlled means.

Another object is to provide an electro-pneumatic brake having means for securing a pneumatic high pressure emergency application of the brakes.

Other objects and advantages will appear in the following more detailed description of the invention.

In the accompanying drawing; Fig. 1 is a diagrammatic view, partly in section, of an electro-pneumatic brake equipment; embodying our improvements; and Fig. 2 a diagram showing the different operating positions of the electro-pneumatic brake valve device.

As shown in the drawing, the equipment may comprise a high pressure in emergency triple valve device 1, a combined electric and pneumatic brake valve device 2, a brake cylinder 3, an auxiliary reservoir 4, application magnet valve device 5, release magnet valve device 6, cut-off magnet valve device 7, interlock switch device 8, cut-off relay valve device 9, and an application relay valve device 10.

The triple valve device 1 may comprise a casing having a piston chamber 11, connected to the usual brake pipe 12 and containing piston 13, and a valve chamber 14, connected to the auxiliary reservoir 4 and containing a main slide valve 15 and a graduating slide valve 16 adapted to be operated by the piston 13.

Contained in the triple valve casing is a high pressure emergency valve device comprising a piston 17 contained in piston chamber 18 and a valve 19 adapted to be operated by piston 17 and contained in valve chamber 20. A fluid pressure supply pipe 21 is connected through passages 22 and 23 with valve chamber 20.

The electro-pneumatic brake valve device 2 may comprise an electric switch portion 24 and a pneumatic portion comprising a rotary valve 25 contained in valve chamber 26 and operable with the switch portion 24 by means of handle 27. The pneumatic portion also includes the usual equalizing discharge valve mechanism, comprising piston 28, having chamber 29 at one side connected to the equalizing reservoir 30 and chamber 31 at the opposite side connected to the brake pipe 12, and a discharge valve 32 operable by piston 28 for venting fluid from the brake pipe.

The application magnet valve device 5 may comprise a magnet 33 and a double beat valve 34 controlled by said magnet. The release magnet valve device 6 may comprise a magnet 35 and a double beat valve 36 and the cut-off magnet valve device 7 may comprise a magnet 37 and a double beat valve 38.

The cut-off relay valve device 9 may comprise a casing containing a valve piston 39 and the application relay valve device 10 may comprise a casing containing a valve piston 40. The interlock switch device 8 comprises a casing having a piston chamber 41 containing a piston 42 and attached to said piston is a stem 43 carrying a contact member 44 adapted, when the piston is moved outwardly, to close the application magnet circuit through contacts 45.

The circuit of the application magnet 33 is controlled by the operation of the brake switch 24 through the interlock switch 8 and the circuits of the release magnet 35 and the cut-off magnet 37 are controlled by said brake switch.

In operation, when the brake pipe 12 is charged with fluid under pressure, fluid flows to piston chamber 11 of the triple valve device and thence through the usual feed groove around the triple valve piston 13 to valve chamber 14 and the auxiliary reservoir 4. A feed valve device 46 supplies fluid from the main reservoir or other source of pressure to pipe 47, which connects with rotary valve chamber 20 of the brake valve device and valve chambers 48 and 49 of the release magnet valve device 6 and the cut-off magnet valve device 7. Pipe 47 is also connected to the outer seated area of the cut-off valve piston 39, and with the magnet 37 deenergized, the spring side of said valve piston is open to the atmosphere by way of the double beat valve 38, so that the valve piston 39 is moved upwardly by fluid pressure from pipe 47, permitting flow to the control pipe 21.

When the brake valve handle 27 is moved to service position to effect a service application of the brakes, fluid is vented from the brake pipe by the usual operation of the pneumatic brake valve device and at the same time the brake switch operates to close the circuits of the magnets 33, 35, and 37. If the circuits are intact and the magnets 35 and 37 are operative, the release magnet 35 will operate the double beat valve 36 to cut off atmospheric communication to pipe 50, leading to switch piston 41, and open communication for supplying fluid under pressure from valve chamber 48 to said piston. The piston 42 is then operated by fluid under pressure to shift the stem 43 and the switch member 44 so as to close the circuit of the application magnet 33. The energization of the magnet 33 causes the operation of the double beat valve 34 from normal position, in which fluid is supplied from the auxiliary reservoir 4, through pipe 51, to the spring side of application valve piston 40 to a position, in which the spring side of said piston is connected through pipe 52 to the brake cylinder 3. The outer seated area of the valve piston 40 is subject to auxiliary reservoir pressure, as supplied through pipe 53, so that when fluid under pressure is vented from the upper face of the valve piston 40, said piston will be moved upwardly, so as to open communication from the auxiliary reservoir 4 to the brake cylinder by way of pipe 54, containing a non-return check valve 55 and a restricted port 56.

The brakes are thus applied by the operation of the electric portion of the equipment and during the above described operation, the triple valve device 1 will not operate, since the auxiliary reservoir pressure on one side of the triple valve piston 13 is being reduced as fast as the brake pipe pressure is being reduced on the other side by operation of the pneumatic brake valve device.

The energization of magnet 37 operates the double beat valve 38 to cut off the atmospheric communication from the spring side of the cut-off valve piston 39 and to connect same with valve chamber 49, so that fluid under pressure is supplied to the spring side of said valve piston and said piston is then moved downwardly to cut off communication from the pipe 47 to the control pipe 21. By this means, the supply of fluid from the control pipe 21, through port 57, to valve chamber 14 and the auxiliary reservoir is cut off and the possible building up of the pressure in the auxiliary reservoir is prevented, which would otherwise tend to cause movement of the triple valve device to application position by the reduction in brake pipe pressure when the brakes are being applied by operation of the electric portion.

In case of a further or over reduction in brake pipe pressure, after the auxiliary reservoir pressure has become equalized with the brake cylinder pressure, the triple valve device might move to application position, and to prevent this, a pipe 58 is provided to connect pipe 54 with the brake pipe 12 and containing a non-return check valve 59.

With this connection, if the auxiliary reservoir pressure should tend to exceed the brake pipe pressure as in the case of an over reduction in brake pipe pressure, the excess pressure in the auxiliary reservoir will equalize into the brake pipe by way of pipe 58, as will be evident.

Should the application magnet 33 fail to operate, due to a broken wire or otherwise, the double beat valve 34 will not be opened to supply fluid from the auxiliary reservoir to the brake cylinder, and since the auxiliary reservoir pressure is not reduced, the reduction in brake pipe pressure which was effected when the brake valve handle was moved to service position, will cause the operation of the triple valve device 1 in the usual manner, to supply fluid from the auxiliary reservoir to the brake cylinder and to thereby effect a pneumatic application of the brakes.

If the release magnet 35 should fail, due to a broken wire or otherwise, the interlock switch piston 42 will not be operated to close the application magnet circuit, and the application magnet thus being prevented from acting, the triple valve device will be operated to effect an application of the brakes.

When the brake valve handle is moved to release position, to effect the release of the brakes, the magnets 33, 35, and 37 are deenergized, and the deenergization of the release magnet 35 operates the double beat valve 36 to connect pipe 64 with the atmosphere. Pipe 64 is connected to the brake cylinder in the release position of the triple valve device by way of passage 65, cavity 66 in slide valve 15 and passage 67, so that fluid is released from the brake cylinder by way of the release magnet valve device.

A check valve 68 is interposed in pipe 64 to prevent flow of fluid from the feed valve pipe 47 to the brake cylinder when the magnet 35 is energized. Check valve 69 prevents back flow through the pipe 21.

If the cut-off magnet 37 should fail to be energized when the release and the application magnets are energized, due to a broken wire, or otherwise, the valve piston 39 will remain open to supply fluid through the control pipe 21 to valve chamber 14. This will not affect or interfere with obtaining an electric application, but may cause movement of the triple valve to service lap or even service position when the brake valve handle is moved to lap position, due to the auxiliary reservoir pressure rising slightly higher than the brake pipe pressure. In this event, the brakes cannot be released electrically, but will be released pneumatically when the brake valve handle is moved to release position.

Means are provided for securing an emergency application of the brakes with high pressure and in the emergency application position, the magnets 33, 35, and 37 remain deenergized, as in release position, and the emergency application is secured pneumatically by the sudden reduction in brake pipe pressure. Upon movement of the triple valve device 1 to emergency position, fluid is supplied from valve chamber 14 and to the auxiliary reservoir, through port 60 in the main slide valve 15, to the brake cylinder 3, and at the same time a port 61 in the main slide valve 15 connects valve chamber 14, through passage 62, with piston chamber 18. Piston 17 is then shifted to the right, so as to unseat the valve 19 and permit flow of fluid from the control pipe 21 to the brake cylinder by way of passage 63.

The check valve 55 prevents loss of brake cylinder pressure by flow to the brake pipe during an emergency application of the brakes, and check valve 59 prevents back flow from the brake pipe 12 to the auxiliary reservoir 4.

Having now described our invention, what we claim as new and desire to secure by Letters Patent, is:—

1. In an electro-pneumatic brake, the combination with an application magnet in one circuit for controlling the application of the brakes, of a release magnet in another circuit for controlling the release of the brakes and for controlling the circuit of said application magnet.

2. In an electro-pneumatic brake, the combination with an application magnet and a valve operated by said magnet for effecting a fluid pressure application of the brakes, of a release magnet, a valve operated by said magnet for controlling the release of the brakes, and means controlled by the release magnet for controlling the circuit of said application magnet.

3. In an electro-pneumatic brake, the combination with an application magnet valve device for controlling the application of the brakes, of a switch device for controlling the circuit of said magnet valve device, and a release magnet valve device for controlling the release of the brakes and for controlling the operation of said switch device.

4. In an electro-pneumatic brake, the combination with an application magnet valve device for controlling the application of the brakes, of a fluid pressure controlled switch device for controlling the circuit of said application magnet valve device, and a release magnet valve device for releasing the brakes upon deenergization of the release magnet and for supplying fluid to said switch device to close the circuit of the application magnet upon energization of the release magnet.

5. In an electro-pneumatic brake, the combination with an application magnet valve device for controlling the application of the brakes and a triple valve device for also controlling the application of the brakes, of an additional source of fluid under pressure from which fluid under pressure is supplied to said triple device and a magnet valve device for controlling communication from said additional source of fluid under pressure to the triple valve device.

6. The combination with a brake pipe, auxiliary reservoir, and triple valve device operated upon a reduction in brake pipe pressure for supplying fluid from the auxiliary reservoir to effect an application of the brakes, of an additional source of fluid pressure from which fluid is supplied to effect an application of the brakes in the emergency position of said triple valve device, a magnet valve device, and means operated upon energization of said magnet valve device for cutting off communication from said additional source to the triple valve device.

7. The combination with a brake pipe, auxiliary reservoir, and triple valve device operated upon a reduction in brake pipe pressure for supplying fluid from the auxiliary reservoir to effect an application of the brakes, of electrically controlled means for also controlling the supply of fluid from the auxiliary reservoir to effect an application of the brakes, and means for permitting back flow from the auxiliary reservoir to the brake pipe.

8. The combination with a brake pipe, auxiliary reservoir, and triple valve device operated upon a reduction in brake pipe pressure for supplying fluid from the auxiliary reservoir to effect an application of the brakes, of electrically controlled means for also controlling the supply of fluid from the auxiliary reservoir to effect an application of the brakes, and means for permitting back flow from the auxiliary reservoir to the brake pipe in case the brake pipe pressure becomes less than the auxiliary reservoir pressure.

9. The combination with a brake pipe, auxiliary reservoir, and triple valve device operated upon a reduction in brake pipe pressure for supplying fluid from the auxiliary reservoir to effect an application of the brakes, of electrically controlled means for also controlling the supply of fluid from the auxiliary reservoir to effect an application of the brakes, means for permitting back flow from the auxiliary reservoir to the brake pipe, and a check valve for preventing flow from the brake pipe to the auxiliary reservoir.

10. In an electro-pneumatic brake, the combination with an auxiliary reservoir, brake pipe, brake cylinder, and a triple valve device operated upon a reduction in brake pipe pressure for supplying fluid from the auxiliary reservoir to the brake cylinder, of a magnet valve device for also supplying fluid from the auxiliary reservoir to the brake cylinder and at the same time opening a communication from the auxiliary reservoir to the brake pipe, and a check valve for preventing flow from the brake cylinder through said communication to the brake pipe.

11. In an electro-pneumatic brake, the combination with an auxiliary reservoir, brake pipe, brake cylinder, and a triple valve device operated upon a reduction in brake pipe pressure for supplying fluid from the auxiliary reservoir to the brake cylinder, of a magnet valve device for also supplying fluid from the auxiliary reservoir to the brake cylinder and at the same time opening a communication from the auxiliary reservoir to the brake pipe, a check valve for preventing flow from the brake cylinder through said communication to the brake pipe, and a check valve for preventing flow from the brake pipe to the auxiliary reservoir.

12. In an electro-pneumatic brake, the combination with an application magnet valve device for controlling the application of the brakes, of a switch device operated by fluid under pressure for closing the circuit of said application magnet valve device and a release magnet valve device operative to close communication through which the brakes are released and to supply fluid to said switch device.

13. In an electro-pneumatic brake, the combination with a brake cylinder and an application magnet valve device for controlling the supply of fluid to the brake cylinder, of a switch device operated by fluid under pressure for closing the circuit of said application magnet valve device, a release magnet valve device for controlling the release of fluid from the brake cylinder and the supply of fluid to said switch device, and a check valve for preventing flow to the brake cylinder of fluid supplied to said switch device.

In testimony whereof we have hereunto set our hands.

CLYDE C. FARMER.
JOSEPH C. McCUNE.